(12) United States Patent
Totori et al.

(10) Patent No.: US 12,321,082 B2
(45) Date of Patent: Jun. 3, 2025

(54) IMAGE PICKUP APPARATUS

(71) Applicant: CANON KABUSHIKI KAISHA, Tokyo (JP)

(72) Inventors: Yuki Totori, Tokyo (JP); Kazuaki Yamana, Kanagawa (JP); Yoshikazu Asai, Kanagawa (JP); Shoma Mizutani, Tokyo (JP); Keisuke Adachi, Tokyo (JP); Sho Nagatsu, Kanagawa (JP); Nagisa Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 18/176,785

(22) Filed: Mar. 1, 2023

(65) Prior Publication Data
US 2023/0280634 A1 Sep. 7, 2023

(30) Foreign Application Priority Data
Mar. 3, 2022 (JP) .................................. 2022-032478

(51) Int. Cl.
*G03B 11/00* (2021.01)
*G03B 7/00* (2021.01)
(Continued)

(52) U.S. Cl.
CPC ................ *G03B 11/00* (2013.01); *G03B 7/00* (2013.01); *G03B 9/08* (2013.01); *G03B 17/14* (2013.01); *H04N 23/55* (2023.01)

(58) Field of Classification Search
CPC ........... H04N 23/55; G03B 17/12; G02B 5/20
See application file for complete search history.

(56) References Cited

U.S. PATENT DOCUMENTS 7,058,295 B2 * 6/2006 Nishiwaki ............... G03B 17/02
396/539
7,570,885 B2 * 8/2009 Nomura ................. G03B 17/12
396/350
(Continued)

FOREIGN PATENT DOCUMENTS

JP 5467326 B 4/2014
JP 2017-151264 A 8/2017
JP 6794600 B 12/2020

OTHER PUBLICATIONS

Digital Photography Review review of the Canon EOS R5, "Body, controls, and handling" section, at <https://www.dpreview.com/reviews/canon-eos-r5-review/3>, dated Oct. 21, 2020 (Year: 2020).*
(Continued)

*Primary Examiner* — Leon W Rhodes, Jr.
(74) *Attorney, Agent, or Firm* — Cowan, Liebowitz & Latman, P.C.

(57) ABSTRACT

An image pickup apparatus includes an image sensor, an optical filter, a holding member configured to hold the optical filter, a driving unit configured to move the holding member, a grip portion configured to be gripped by a user, and a light blocking member configured to control blocking or opening of an image pickup range. The driving unit moves the optical filter between (i) a first position at which the optical filter is inserted into the image pickup range and (ii) a second position at which the optical filter is retracted from the image pickup range in a direction from the first position toward the grip portion. The optical filter is located on a side closer to the image sensor than the light blocking member.

17 Claims, 12 Drawing Sheets

(51) Int. Cl.
*G03B 9/08* (2021.01)
*G03B 17/14* (2021.01)
*H04N 23/55* (2023.01)

(56) References Cited

U.S. PATENT DOCUMENTS

| | | | |
|---|---|---|---|
| 7,672,576 B2* | 3/2010 | Grossbach | F24H 15/174 |
| | | | 392/441 |
| 8,373,795 B2* | 2/2013 | Shintani | G03B 17/14 |
| | | | 348/374 |
| 10,681,252 B2* | 6/2020 | Tokiwa | G03B 17/563 |
| 12,114,053 B2* | 10/2024 | Kuroki | H04N 23/50 |
| 2006/0216005 A1* | 9/2006 | Moriya | G03B 7/08 |
| | | | 396/6 |

OTHER PUBLICATIONS

Digital Photography Review review of the Nikon Z7 II <https://www.dpreview.com/reviews/nikon-z7-ii-review>, dated Mar. 15, 2021 (Year: 2021).*

Digital Photography Review review of the Sony A7 IV <https://www.dpreview.com/reviews/sony-a7-iv-review>, dated Feb. 10, 2022 (Year: 2022).*

* cited by examiner

IMAGE PICKUP APPARATUS

BACKGROUND OF THE INVENTION

Field of the Invention

The aspect of the embodiments relates to an image pickup apparatus.

Description of the Related Art

There has been a known image pickup apparatus capable of capturing an image using an optical filter such as a neutral density filter (ND filter). Japanese Patent No. ("JP") 6794600 discloses an image pickup apparatus including a plurality of ND filters, and the ND filters can be inserted and retracted up and down. Japanese Patent Application Laid-Open No. ("JP-A") 2017-151264 discloses an image pickup apparatus to which an interchangeable optical filter can be attached. JP 5467326 discloses an image pickup apparatus including an ND filter and a focal plane shutter.

The image pickup apparatus disclosed in JP 6794600 requires space for the optical filter to be retracted up and down, which increases the size of the image pickup apparatus. In the image pickup apparatus disclosed in JP-A 2017-151264, when the optical filter is changed, the optical filter is to be detached after a lens is detached, and the optical filter cannot be easily switched. In the image pickup apparatus disclosed in JP 5467326, the ND filter is located on a side closer to a body mount and the focal plane shutter is located on a side farther from the body mount. Hence, when a lens is not attached, such as when the lens is interchanged, dust may enter the inside of the image pickup apparatus from the outside and may attach to the ND filter, and the dust may appear in an image when the image is captured.

SUMMARY OF THE INVENTION

The present disclosure provides an image pickup apparatus that can easily switch an optical filter between a use state and a non-use state without becoming large, and can hinder dust from attaching to the optical filter.

An image pickup apparatus according to one aspect of embodiments of the disclosure includes an image sensor, an optical filter, a holding member configured to hold the optical filter, a driving unit configured to move the holding member, a grip portion configured to be gripped by a user, and a light blocking member configured to control blocking or opening of an image pickup range. The driving unit moves the optical filter between (i) a first position at which the optical filter is inserted into the image pickup range and (ii) a second position at which the optical filter is retracted from the image pickup range in a direction from the first position toward the grip portion. The optical filter is located on a side closer to the image sensor than the light blocking member.

Further features of the present invention will become apparent from the following description of exemplary embodiments with reference to the attached drawings.

DESCRIPTION OF THE EMBODIMENTS

Figure 1A:
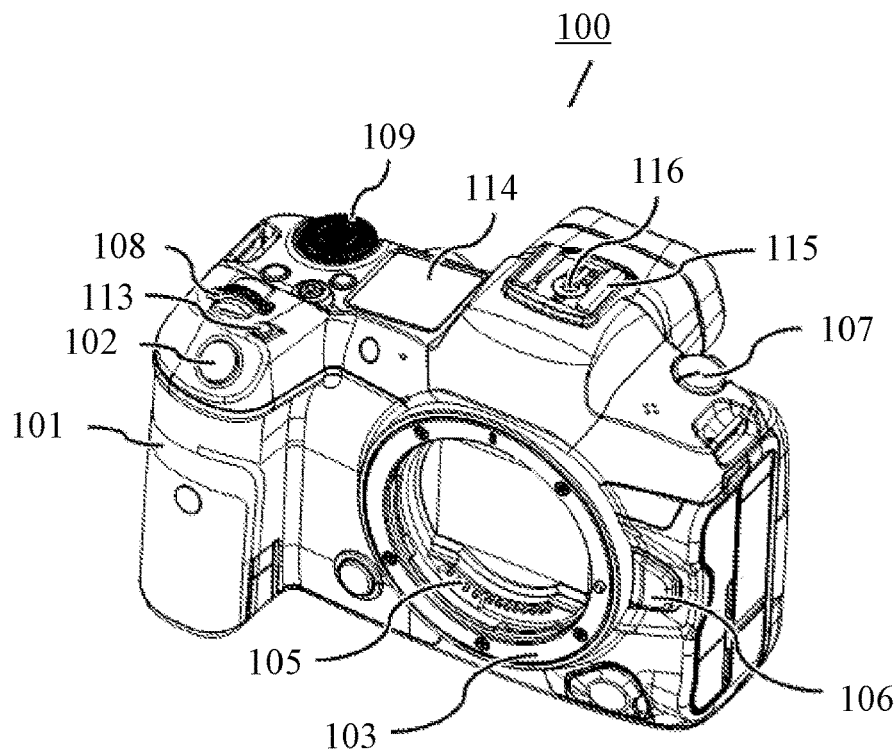
FIGS. 1A and 1B are external perspective views of an image pickup apparatus according to a first embodiment.

Referring now to the accompanying drawings, a description is given of embodiments according to the present disclosure. Corresponding elements in respective figures are designated by the same reference numerals. Moreover, each embodiment is an example for realizing the present disclosure, and is to be properly modified or changed depending on a configuration of an apparatus or various conditions to which the present disclosure is applied, and thus the present disclosure is not limited to the following embodiments. In addition, parts of the following embodiments may be properly combined.

First Embodiment

Figure 1B:
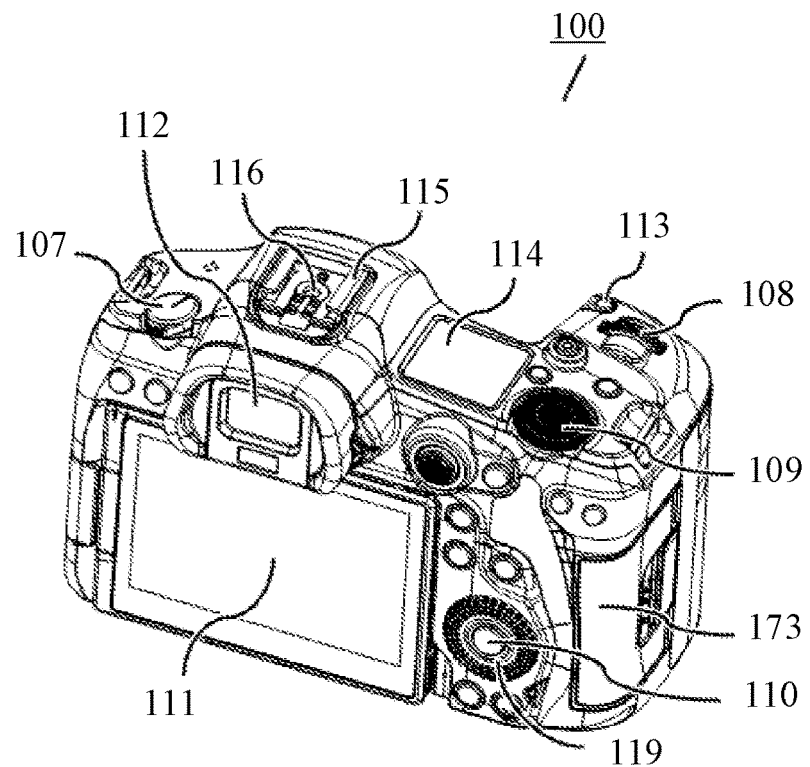

First, with reference to FIGS. 1A and 1B, a description is given of an image pickup apparatus according to the first embodiment of the present disclosure. FIGS. 1A and 1B are external perspective views of an image pickup apparatus (camera main body) 100 according to this embodiment. FIG. 1A is an external perspective view of the image pickup apparatus 100 viewed from the front surface side and illustrates a state in which a lens apparatus (interchangeable lens) 104 (refer to FIG. 2) detachably attachable to the image pickup apparatus 100 is detached. FIG. 1B is an external perspective view of the image pickup apparatus 100 viewed from the rear surface side. Although in this embodiment, a description is given of an image pickup system in which the lens apparatus 104 is detachably attachable to the image pickup apparatus (camera main body) 100, this embodiment is not limited to this and can also be applied to an image pickup apparatus in which a camera main body and a lens apparatus are integrally configured.

The image pickup apparatus 100 has a grip portion 101 that is gripped by a user to stably hold the image pickup apparatus 100. A shutter button 102 which is a switch for starting imaging is provided on the upper part of the grip portion 101. A mount portion (lens mount) 103 is provided in the front part of the image pickup apparatus 100, and the lens apparatus 104 is detachably attachable to the image pickup apparatus 100 via the mount portion 103. An opening 190 (refer to FIGS. 4A to 4C and FIG. 5) is provided inside the mount portion 103, and the opening 190 defines an image pickup range. A mount contact portion 105 electrically connects the image pickup apparatus 100 and the lens apparatus 104, supplies power to the lens apparatus 104, and uses electrical signals to perform communication relating to lens control and lens data. When the lens apparatus 104 is to be interchanged, the lens apparatus 104 can be detached by releasing locking by pushing a lens lock release button 106.

A power switch 107 is used when power of the image pickup apparatus 100 is to be turned on and off. A main electronic dial 108 and a sub electronic dial 119 are rotational operation members that can be rotated clockwise and counterclockwise, and can be rotated when various setting values, such as a diaphragm value and a shutter speed, are to be changed. A mode switching dial 109 is an operation unit for switching image pickup modes, and is used when the image pickup mode is to be switched to various modes such as a shutter speed priority image pickup mode, a diaphragm value priority image pickup mode, and a motion image pickup mode. A SET button 110 is a push button and is mainly used for determining selection items.

A liquid crystal monitor 111 displays various setting screens of the image pickup apparatus 100, captured images, and live view images. An electronic viewfinder 112 includes a viewfinder that an eye can approach and displays various setting screens of the image pickup apparatus 100, captured images, and live view images. A multifunction button 113 is a push button to which the user can arbitrarily assign switching of various settings relating to imaging. A display panel 114 displays various setting states of the image pickup apparatus 100 such as an image pickup mode and ISO sensitivity. The display panel 114 displays an image even in a state where the image pickup apparatus 100 is powered off.

An accessory shoe 115 includes an accessory contact 116 to which various accessories such as an external strobe and a microphone can be attached. A media slot lid 173 can be opened and closed, and in a state where the media slot lid 173 is opened, an external recording medium (recording medium) 148 (refer to FIG. 2) such as an SD card can be inserted into or ejected from an internal media slot (memory medium insertion portion) 172 (refer to FIG. 9).

Figure 2:
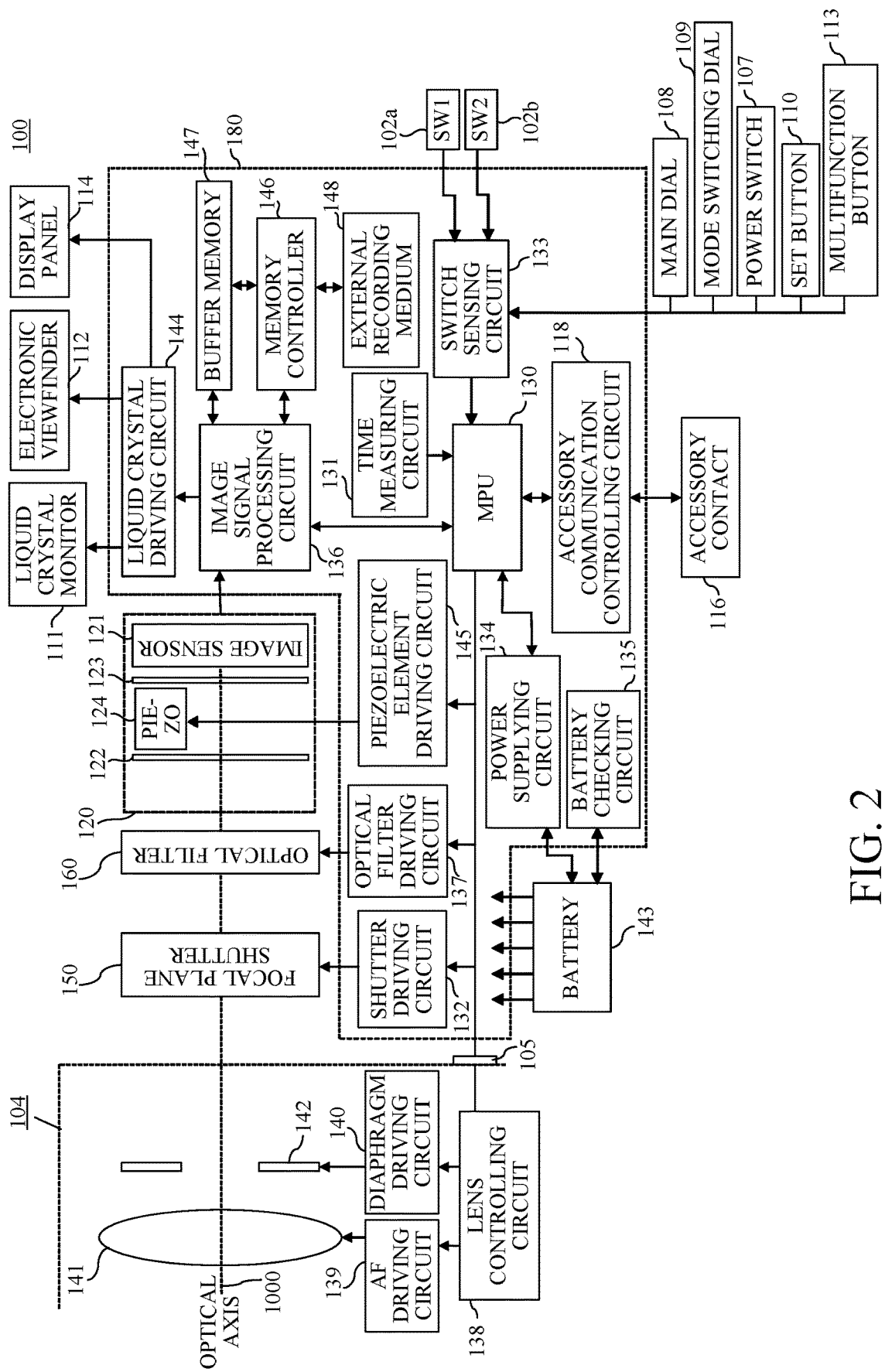
FIG. 2 is a block diagram of the image pickup apparatus according to the first embodiment.

Next, with reference to FIG. 2, a description is given of an electrical configuration and operation of the image pickup apparatus 100. FIG. 2 is a block diagram of the image pickup apparatus 100 and illustrates a state in which the lens apparatus 104 is attached. Components common to FIGS. 1A and 1B are denoted by the same reference numerals.

An MPU 130 is a small central processing unit (control unit) built into the image pickup apparatus 100. A time measuring circuit 131, a shutter driving circuit 132, a switch sensing circuit 133, a power supplying circuit 134, a battery checking circuit 135, an image signal processing circuit 136, an optical filter driving circuit 137, and a piezoelectric element driving circuit 145 are connected to the MPU 130. The MPU 130 controls operation of the image pickup apparatus 100, processes input information, transmits instructions to each element, and controls each element. The MPU 130 includes an EEPROM and can store time information from the time measuring circuit 131 and various setting information.

The MPU 130 communicates with a lens controlling circuit 138 in the lens apparatus 104 via the mount contact portion 105. Thereby, the MPU 130 can control operation of a focus lens 141 and an electromagnetically driven diaphragm (aperture diaphragm) 142 via an AF driving circuit 139 or a diaphragm driving circuit 140. In FIG. 2, only a single focus lens 141 is schematically illustrated as an image pickup optical system of the lens apparatus 104, but the image pickup optical system actually includes a plurality of lens units.

An AF driving circuit 139 is connected to, for example, a stepping motor (not illustrated) and the AF driving circuit 139 drives the focus lens 141. The MPU 130 calculates a focus lens driving amount based on a defocus amount detected using a focus signal read from an image sensor 121 and transmits a focusing instruction including the focus lens driving amount to the lens controlling circuit 138. The lens controlling circuit 138 that has received the focusing instruction controls driving of the focus lens 141 via the AF driving circuit 139. In this way, autofocus (AF) is performed.

The diaphragm driving circuit 140 is connected to a diaphragm actuator such as a stepping motor (not illustrated) to drive a plurality of diaphragm blades (not illustrated) that form a diaphragm aperture in the electromagnetically driven diaphragm 142. By driving the plurality of diaphragm blades, the size of the diaphragm aperture (aperture diameter) is changed and a light amount is adjusted.

The MPU 130 calculates the diaphragm driving amount of the electromagnetically driven diaphragm 142 from a luminance signal read from the image sensor 121 and transmits a diaphragm instruction including the diaphragm driving amount to the lens controlling circuit 138. That is, with the lens controlling circuit 138, the MPU 130 performs communication for controlling the electromagnetically driven diaphragm 142. The lens controlling circuit 138, which has received the diaphragm instruction, controls the driving of the electromagnetically driven diaphragm 142 via the diaphragm driving circuit 140. In this way, a proper diaphragm value (F value) is automatically set.

A mechanical focal plane shutter 150 is a light blocking member that controls blocking or opening of the image pickup range (opening 190) and is driven by the shutter driving circuit 132. At the time of imaging, from the time the user presses the shutter button 102, a front curtain shutter (not illustrated) travels so as to open the shutter, and a rear curtain shutter (not illustrated) travels according to a desired exposure time so as to close the shutter. Thereby, the exposure time to the image sensor 121 is controlled. The front curtain shutter of the focal plane shutter 150 is closed in a state where the power is turned off, so that dust is prevented from entering the image pickup apparatus 100 through the opening 190.

The optical filter 160 is an optical element that imparts a special effect to an image by diffusing entering light or attenuating a certain wavelength range. The optical filter 160 includes an ND filter that attenuates an entering light amount at a certain rate, a polarized light (PL) filter including a polarizing film to reduce reflected light, a soft filter that diffuses light to create soft expressions, and the like. However, the optical filter 160 is not limited to these. An optical filter driving circuit 137 can drive the optical filter 160 and move a position of the optical filter 160. A detailed configuration of the optical filter 160 is described below.

The image pickup unit 120 mainly includes a unit including an optical low pass filter 122, an optical low pass filter holding member 123, a piezoelectric element (piezoelectric member: "piezo" in the drawing) 124, and an image sensor 121. The image sensor 121 photoelectrically converts an object image (optical image) formed via the lens apparatus 104. In this embodiment, the image sensor 121 is a complementary metal-oxide-semiconductor (CMOS) sensor, but is not limited to this. As the image sensor 121, a chargecoupled device (CCD) sensor, a charge injection device (CID) sensor, or the like may be used. The optical low pass filter 122 disposed in front of the image sensor 121 is a single birefringent plate made of crystal and has a rectangular shape. The piezoelectric element 124 is a single-plate piezoelectric element (piezo element), and is configured to be vibrated by a piezoelectric element driving circuit 145 that receives an instruction from the MPU 130, and to transmit vibration to the optical low pass filter 122. This vibration can shake off fine dust attached to the optical low pass filter 122.

The image signal processing circuit 136 performs entire image processing including filtering, data compression processing, and the like on electrical signals acquired from the image sensor 121. Image data for monitor display from the image signal processing circuit 136 is displayed on the liquid crystal monitor 111 and the electronic viewfinder 112 via a liquid crystal driving circuit 144. The image signal processing circuit 136 can also store image data in a buffer memory 147 via a memory controller 146 according to instructions from the MPU 130. The image signal processing circuit 136 can also perform image data compression processing such as compression to JPEG. In a case where imaging is continuously performed such as a case of continuous imaging, image data can be temporarily stored in the buffer memory 147 and unprocessed image data can be sequentially read via the memory controller 146. As a result, the image signal processing circuit 136 can sequentially perform image processing and compression processing regardless of the speed of image data input.

The memory controller 146 has a function of storing image data in the external recording medium 148 and a function of reading image data stored in the external recording medium 148. The external recording medium 148 is an SD card, a CF card, or the like that is detachably attachable to the image pickup apparatus 100, but is not limited to these.

The switch sensing circuit 133 transmits an input signal to the MPU 130 according to an operation state of each switch. A switch SW1 (102a) is turned on by a first stroke (half pressing) on the shutter button 102. A switch SW2 (102b) is turned on by a second stroke (full pressing) on the shutter button 102. When the switch SW2 (102b) is turned on, an instruction to start imaging is transmitted to the MPU 130. The main electronic dial 108, the mode switching dial 109, the power switch 107, the SET button 110, the multifunction button 113, and the like are also connected to the switch sensing circuit 133.

The MPU 130 performs information communication via an accessory contact 116 by an accessory communication controlling circuit 118 in order to use a function of an unillustrated accessory unit. The power supplying circuit 134 distributes and supplies power from a battery 143 to each element of the image pickup apparatus 100. The battery checking circuit 135 is connected to the battery 143 and the battery checking circuit 135 notifies the MPU 130 of remaining amount information and the like of the battery 143.

Figure 3:
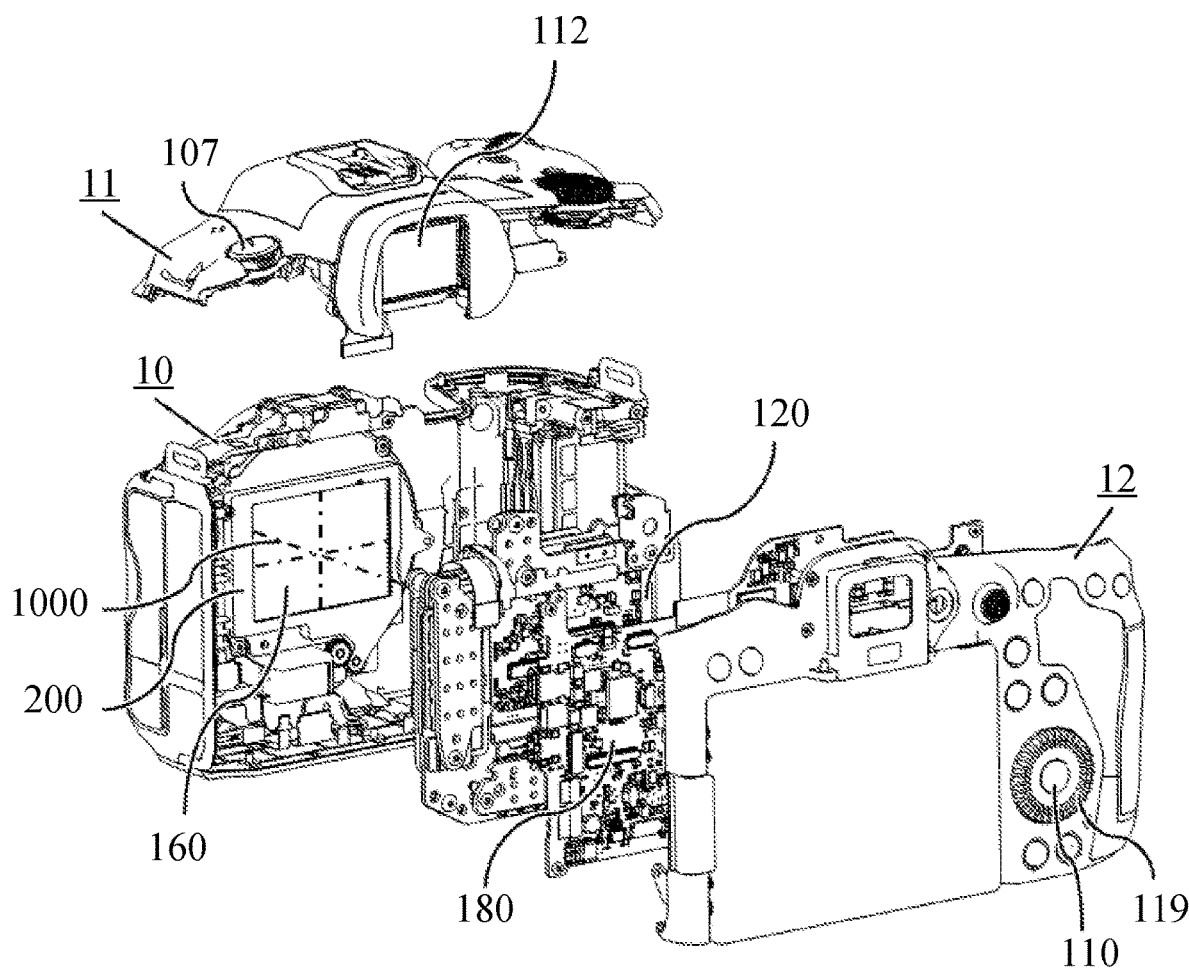
FIG. 3 is an exploded perspective view of the image pickup apparatus according to the first embodiment.

Next, with reference to FIG. 3, a description is given of an internal configuration of the image pickup apparatus 100. FIG. 3 is an exploded perspective view of the image pickup apparatus 100. The image pickup apparatus 100 has a structure covered mainly by exteriors of a front cover 10, a top cover 11, and a rear cover 12, to each of which an operation member or a display member is attached. In order from a side closer to an object, the focal plane shutter 150, a holding member 200, the image pickup unit 120, and a main board (control board) 180 are arranged on an optical axis 1000 of the image pickup optical system. The holding member 200 includes the optical filter 160. The optical filter 160 may include any optical member such as an ND filter, a PL filter, and a soft filter (low-pass filter). In a state where the optical filter 160 is not inserted, the image pickup apparatus 100 can also be operated normally.

Figure 4A:
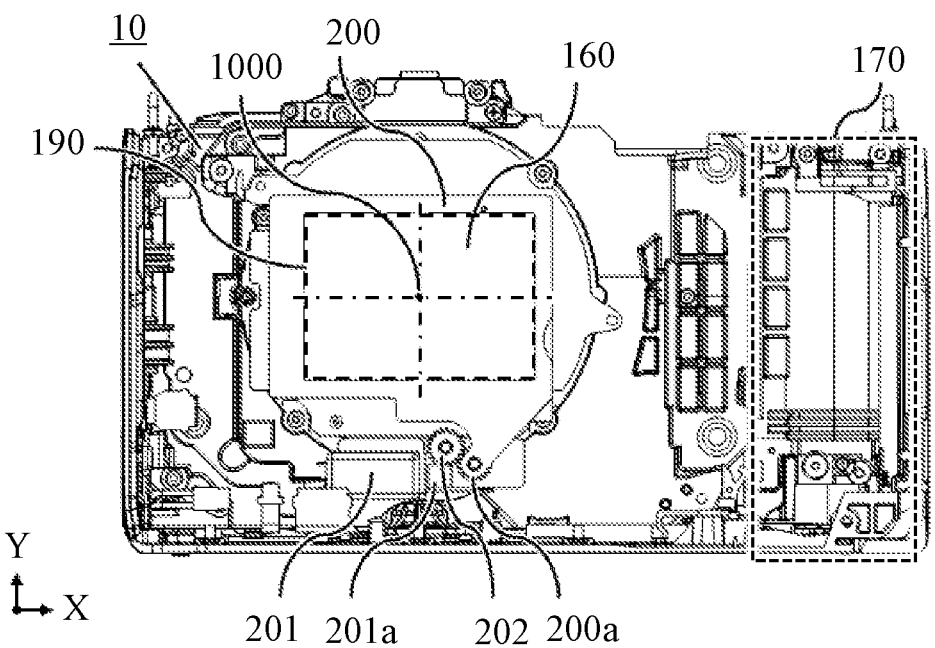
FIGS. 4A to 4C are explanatory diagrams when an optical filter is driven according to the first embodiment.
Figure 4B:
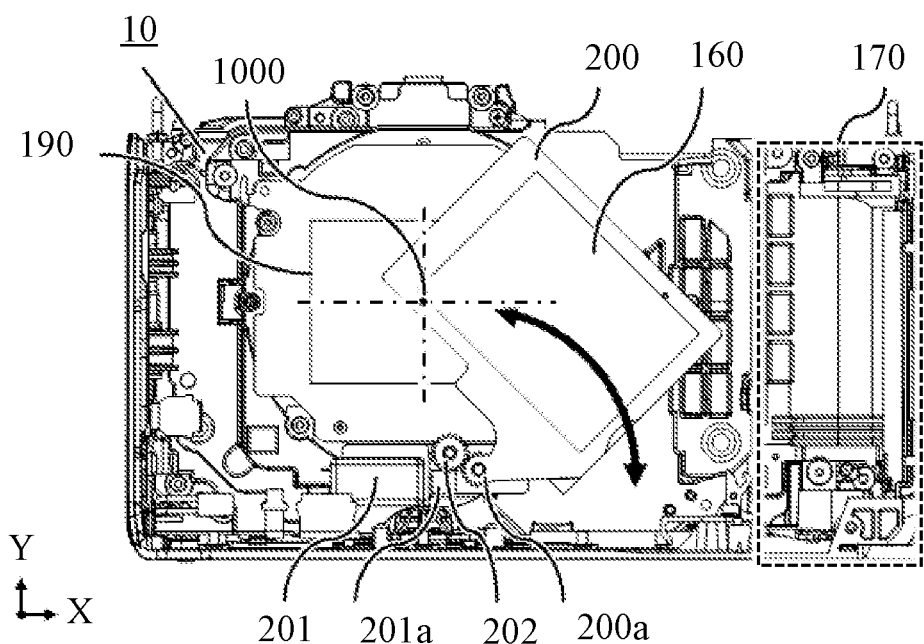
Figure 4C:
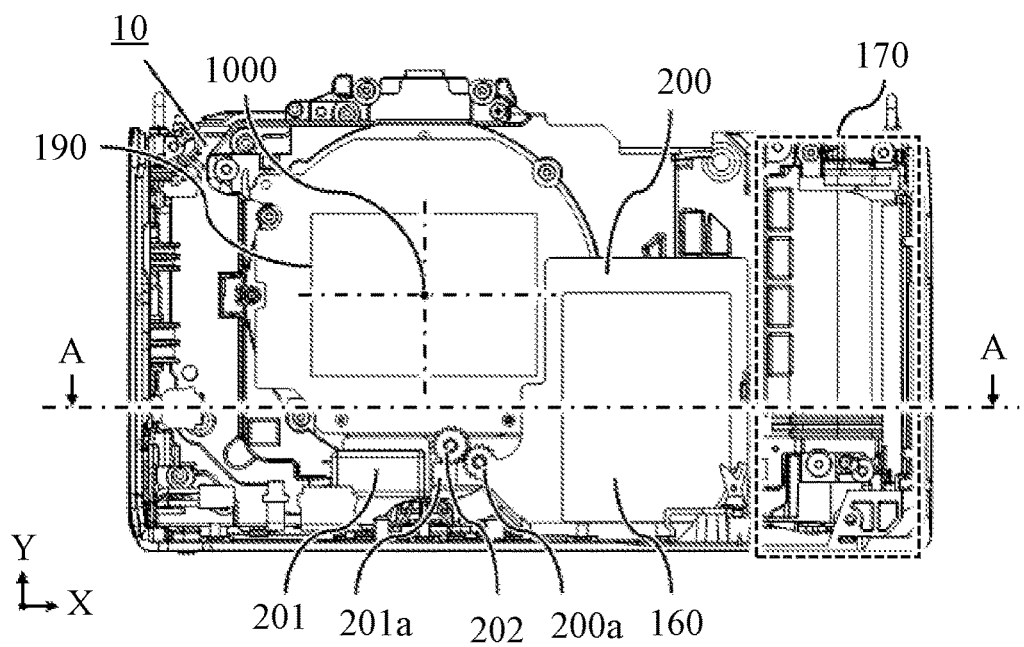

Next, with reference to FIGS. 4A to 4C, a description is given of a configuration of the optical filter 160 and its switching operation. FIGS. 4A to 4C are explanatory diagrams of the optical filter 160 when it is driven, and illustrate components relating to the optical filter 160 and the holding member 200 viewed from the rear surface side of the image pickup apparatus 100. The focal plane shutter 150 is omitted in FIGS. 4A to 4C.

The optical filter 160 is inserted and held in the holding member 200. The holding member 200 includes a gear shape 200a and is attached to the front cover 10 so that the holding member 200 is rotatable about the gear shape 200a. A motor (actuator, driving unit) 201 for driving the optical filter 160 is attached to the front cover 10, and a worm gear 201a is attached to a driving shaft of the motor 201. The worm gear 201a can rotate the holding member 200 by transmitting a rotational force to the gear shape 200a of the holding member 200 via the idler gear 202. A battery housing portion 170 that houses the battery 143 is provided on the right side of the front cover 10.

In this embodiment, the multifunction button 113 is assigned a switching function of inserting/retracting the optical filter 160. Next, a description is given of operation when the optical filter 160 is driven by a user's operation. For the switching operation of the optical filter 160, other buttons, dials, switches, setting screens, etc. may be used.

FIG. 4A illustrates an inserted state in which the optical filter 160 is inserted into the opening 190 provided inside the mount portion 103 of the image pickup apparatus 100 and the optical filter 160 and the opening 190 overlap. The opening 190 defines the image pickup range. Thus, light entering the image sensor 121 passes through the optical filter 160, and various imaging expressions are made to be available by the effects of the optical filter 160. For example, in a case where an ND filter is inserted as the optical filter 160, the entering light is attenuated, making it possible to perform long exposure imaging and hinder overexposure even in a bright environment.

In a case where the multifunction button 113 is pressed in the inserted state illustrated in FIG. 4A, the switch sensing circuit 133 senses the press. At this time, an instruction for driving the motor 201 is transmitted from the MPU 130, and the optical filter driving circuit 137 causes the motor 201 to start rotating. The rotation of the motor 201 is transmitted from the worm gear 201a via the idler gear 202 to the gear shape 200a, and the holding member 200 including the gear shape 200a starts rotating. FIG. 4B illustrates a state in the middle of rotation (middle state).

The holding member 200 moves through the middle state illustrated in FIG. 4B to a retracted state illustrated in FIG. 4C. The rotational shaft of the gear shape 200a is located on a side to which the bottom surface of the image pickup apparatus 100 is closer than the optical axis 1000 is. As a result, as illustrated in FIG. 4B, the holding member 200 can rotate without interfering with internal components such as the top cover 11. Similarly, by arranging the motor 201 on the side to which the bottom surface is closer than the optical axis 1000, a driving force transmission distance to the gear shape 200a is shortened, and driving efficiency is improved.

When the holding member 200 reaches the retracted state position (second position) illustrated in FIG. 4C, a detection signal from a position sensor (not illustrated) causes the optical filter driving circuit 137 to stop the motor 201. The position sensor is a position detecting unit such as a photoreflector, but the driving stop timing may be determined by any method such as detection of a rotational angle of the motor 201 and detection by a mechanical switch.

FIG. 4C illustrates the retracted state in which the holding member 200 rotates substantially 90 degrees in a plane parallel to the image pickup unit 120 from the inserted state of FIG. 4A and then retracts from the opening 190. Since the holding member 200 is retracted, the light collected by the lens apparatus 104 enters the image sensor 121 without passing through the optical filter 160.

Figure 5:
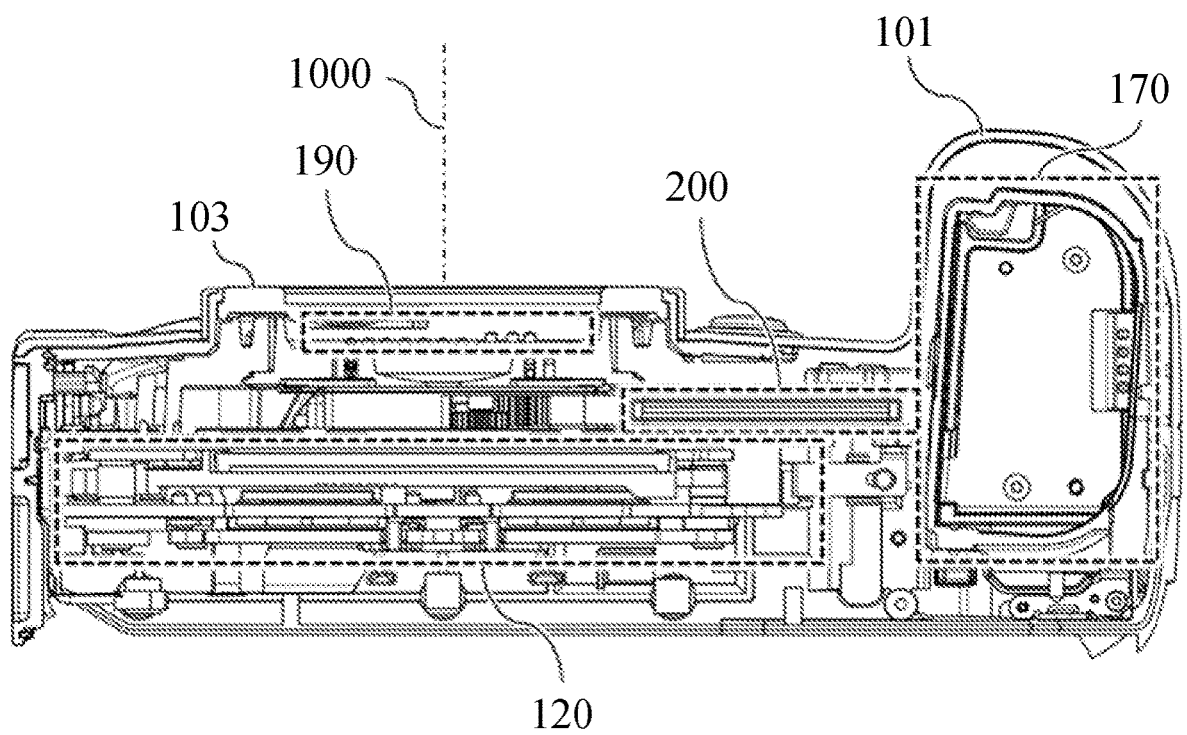
FIG. 5 is a sectional view of the image pickup apparatus according to the first embodiment.

FIG. 5 is a sectional view of the image pickup apparatus 100 and illustrates a section along a line AA in FIG. 4C. As illustrated in FIG. 5, the holding member 200 is retracted into a position between the opening 190 and the battery housing portion 170, i.e., between the opening 190 and the grip portion 101. By rotating the holding member 200 substantially 90 degrees from the inserted state, a short side of the optical filter 160 becomes substantially parallel to an X direction (lateral direction of the image pickup apparatus 100) and the optical filter 160 can be housed between the opening 190 and the battery housing portion 170.

If the user wants to reinsert the optical filter 160 into the opening 190, the user presses the multifunction button 113 in the retracted state illustrated in FIG. 4C, and thereby the motor 201 is caused to rotate in a direction opposite to a rotational direction in the above-described operation. This causes the optical filter 160 to move through the middle state illustrated in FIG. 4B to the inserted state illustrated in FIG. 4A. When the optical filter 160 moves to the position of the inserted state (first position) illustrated in FIG. 4A, the detection signal from the position sensor (not illustrated) causes the optical filter driving circuit 137 to stop the motor 201 similarly to the retracted state.

With the above configuration, the image pickup apparatus 100 including the optical filter 160 can easily switch the optical filter 160 between the inserted state and the retracted state without increasing the size of the image pickup apparatus 100.

Figure 6:
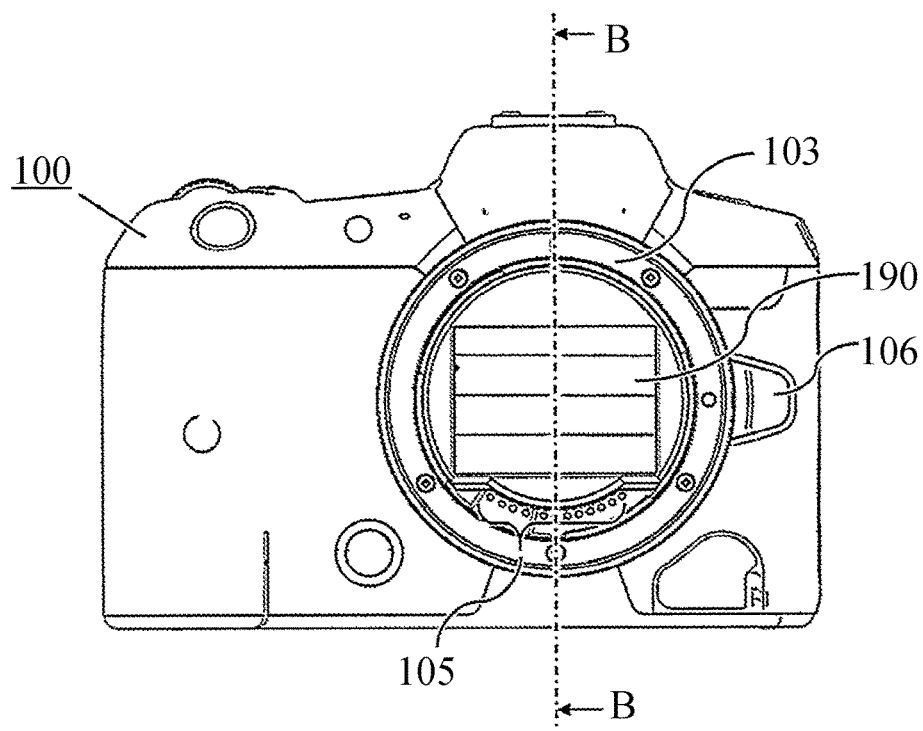
FIG. 6 is a front view of the image pickup apparatus according to the first embodiment.
Figure 7:
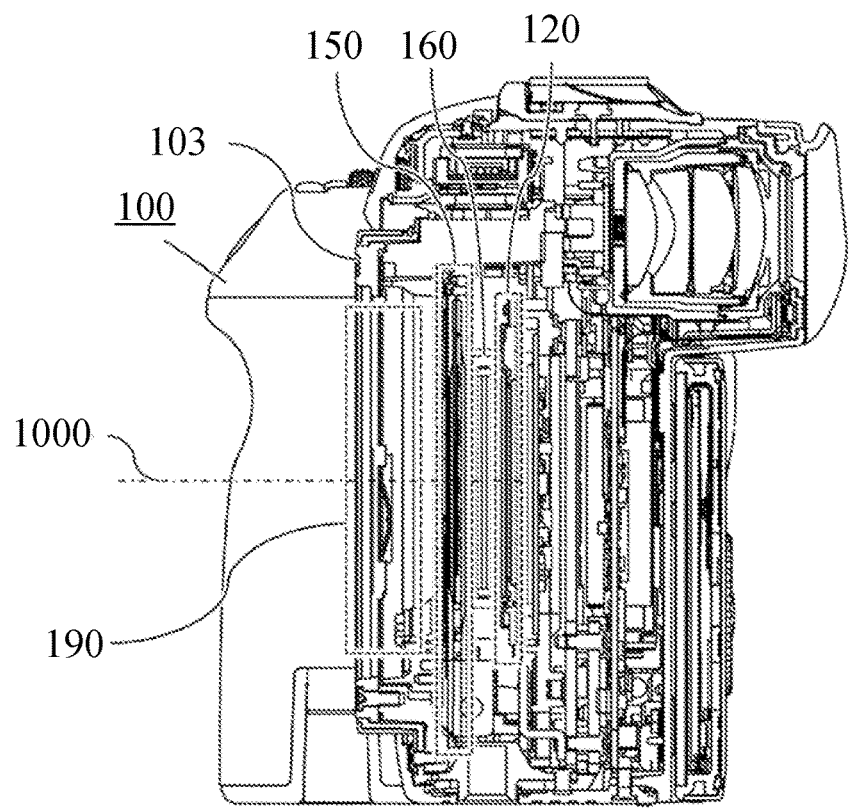
FIG. 7 is a longitudinal sectional view of the image pickup apparatus according to the first embodiment.

Next, with reference to FIGS. 6 and 7, a detailed description is given of an arrangement order on the optical axis of the focal plane shutter 150, the optical filter 160, and the image pickup unit 120 according to this embodiment. FIG. 6 is a front view of the image pickup apparatus 100. FIG. 7 is a longitudinal sectional view of the image pickup apparatus 100 and illustrates a section along a line BB in FIG. 6.

As illustrated in FIG. 7, on the optical axis 1000, the focal plane shutter 150, the optical filter 160, and the image pickup unit 120 are arranged in order from the side closer to the mount portion 103. The front curtain shutter of the focal plane shutter 150 is closed when an image is not captured or when the power is turned off for interchanging the lens. Such a configuration can provide the following effects.

By closing the focal plane shutter 150 near the opening 190 when the lens is not attached, such as when the lens is to be interchanged, dust can be prevented from entering the image pickup apparatus 100 from the opening 190. Therefore, it is possible to reduce a problem that dust attaches to the optical filter 160, the optical low pass filter 122 of the image pickup unit 120, and the like that are disposed on an inner side of the focal plane shutter 150, and the dust appears in a captured image.

Furthermore, a distance between the focal plane shutter 150 and the image sensor 121 can be increased. This reduces a problem that dust generated by traveling of the front curtain shutter or the rear curtain shutter of the focal plane shutter 150 directly attaches to the optical low pass filter 122 of the image pickup unit 120 and the dust appears in a captured image.

As described above, the motor 201 causes the optical filter 160 to move between the first position (the position of the inserted state) at which the optical filter 160 is inserted into the image pickup range (opening 190) and a second position (the position of the retracted state) at which the optical filter 160 is retracted from the first position toward the grip portion 101. The first position is a position at which the optical filter 160 covers the image pickup range (an image pickup area including the optical axis 1000), and the second position is a position at which the optical filter 160 does not overlap the image pickup range. The optical filter 160 is located on a side closer to the image sensor 121 than the light blocking member (focal plane shutter 150). In other words, when the optical filter 160 is at the first position, the optical filter 160 is located between the image sensor 121 and the light blocking member.

The optical filter 160 may rotate substantially 90 degrees to move from the first position and to the second position. The second position may be a position between the image pickup range and the battery 143 that can be inserted into and ejected from the image pickup apparatus 100. The optical filter 160 may retract from the first position to the second position substantially parallelly to a plane orthogonal to the optical axis 1000 of the image pickup optical system. The optical filter 160 may rotationally move about a shaft (rotational shaft of the gear shape 200a) provided at a position to which the bottom surface of the image pickup apparatus 100 is closer than the optical axis 1000 is. The shaft may be provided at a position to which the bottom surface is closer than the image pickup range is. The shaft may be provided between the optical axis 1000 and a short side closer to the grip portion 101 of the two short sides defining the image pickup range when viewed from the rear surface side of the image pickup apparatus 100. The motor 201 may be located on a side to which the bottom surface of the image pickup apparatus 100 is closer than the optical axis 1000 is. The light blocking member may be located on a side closer to the mount portion 103 than the optical filter 160. The image pickup range may be defined by an opening 190 provided inside the mount portion 103.

Second Embodiment

Next, a description is given of an image pickup apparatus according to the second embodiment of the present disclosure. In the first embodiment, a description is given of an example in which the present disclosure is applied to a general image pickup apparatus 100 having a single grip portion 101. On the other hand, this embodiment describes an image pickup apparatus 100a including two grip portions. In the image pickup apparatus 100a according to this embodiment, configurations and operations common to those of the image pickup apparatus 100 according to the first embodiment are described with the same reference numerals used, and a detailed description thereof is omitted.

Figure 8A:
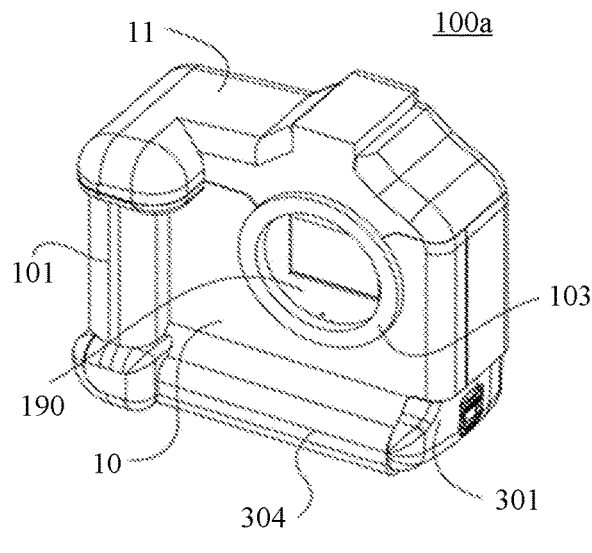
FIGS. 8A and 8B are external perspective views of an image pickup apparatus according to a second embodiment.
Figure 8B:
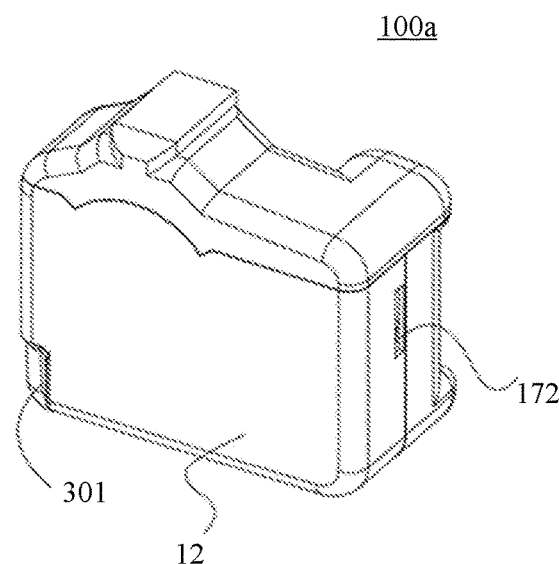

First, a description is given of a difference between the image pickup apparatus 100a according to this embodiment and the image pickup apparatus 100 according to the first embodiment with reference to FIGS. 8A and 8B. FIGS. 8A and 8B are perspective views illustrating the image pickup apparatus 100a according to this embodiment. FIG. 8A is an external perspective view of the image pickup apparatus 100a viewed from a front surface side, and illustrates a state in which the lens apparatus 104 detachably attachable to the image pickup apparatus 100a is detached. FIG. 8B is an external perspective view of the image pickup apparatus 100a viewed from a rear surface side. The image pickup apparatus 100a includes the grip portion 101 which is gripped when the image pickup apparatus 100a is held in a normal position, and a grip portion 304 which can be gripped when the image pickup apparatus 100a is held in a vertical position. A detailed description is omitted of the gripping states in the normal position and the vertical position.

Figure 9:
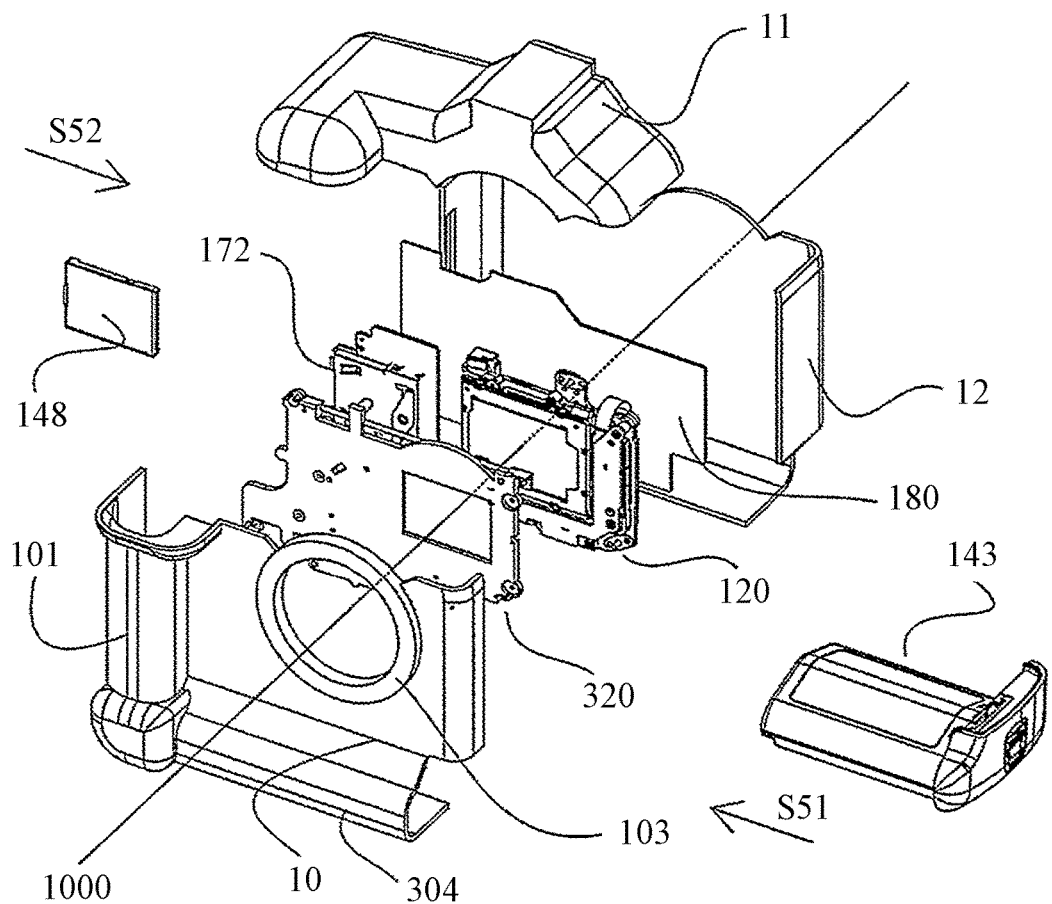
FIG. 9 is an exploded perspective view of the image pickup apparatus according to the second embodiment.

Next, with reference to FIG. 9, a description is given of a configuration of the image pickup apparatus 100a according to this embodiment. FIG. 9 is an exploded perspective view of the image pickup apparatus 100a. An exterior of the image pickup apparatus 100a mainly includes a front cover 10, a top cover 11, and a rear cover 12, similarly to the image pickup apparatus 100 according to the first embodiment. The battery 143 is disposed at a bottom side of the image pickup apparatus 100a and can be inserted and ejected in a direction of an arrow S51. The external recording medium 148 can be inserted into the media slot 172 provided on a side surface portion of the image pickup apparatus 100a in a direction of an arrow S52. The media slot 172 includes a push-type lever, and the external recording medium 148 can be attached or detached by pushing the lever. The mount portion 103 and the image pickup unit 120 are located on the optical axis 1000, and a focal plane shutter (light blocking member) 350 and an optical filter unit 320 are arranged between those.

Figure 10:
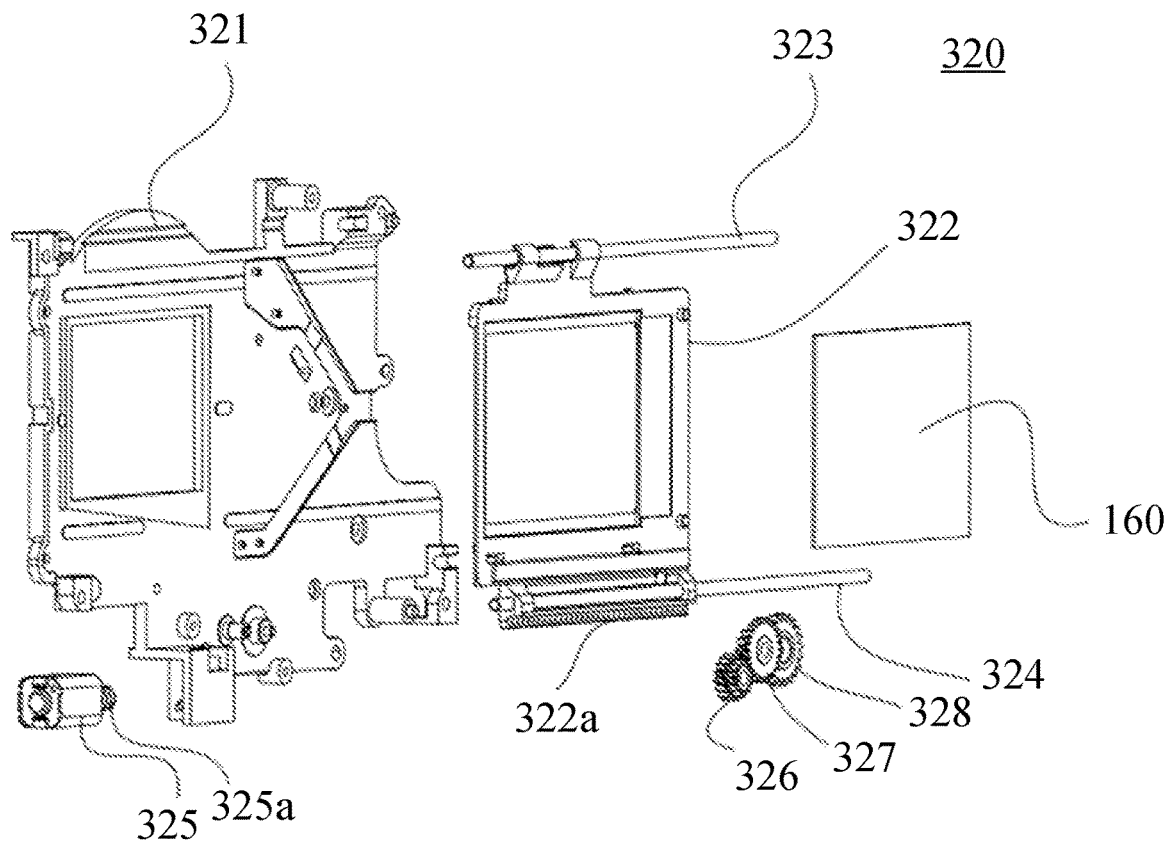
FIG. 10 is an exploded perspective view of an optical filter unit according to the second embodiment.

With reference to FIG. 10, a description is given of a configuration of the optical filter unit 320 according to this embodiment. FIG. 10 is an exploded perspective view of the optical filter unit 320. Components of the optical filter unit 320 are attached to a base member 321. The optical filter 160 is held by a holding member 322. The holding member 322 includes a rack gear shape 322a.

The holding member 322 engages with an upper rail 323 and a lower rail 324 as guide members and can drive the optical filter 160 in a certain direction. A motor (actuator, driving unit) 325 for driving the optical filter 160 is disposed below the holding member 322, and a pinion gear 325a is attached to a driving shaft. A first gear 326, a second gear 327, and a third gear 328 are rotatably attached to a shaft provided on the base member 321.

Figure 11A:
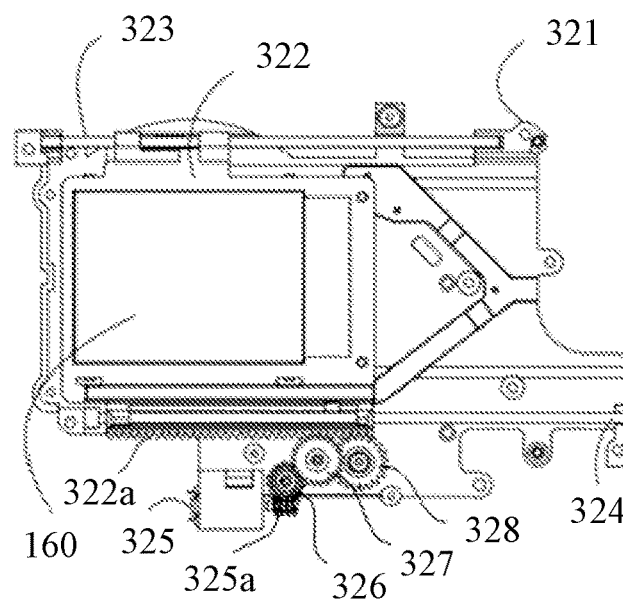
FIGS. 11A to 11C are explanatory diagrams when the optical filter unit is driven according to the second embodiment.
Figure 11B:
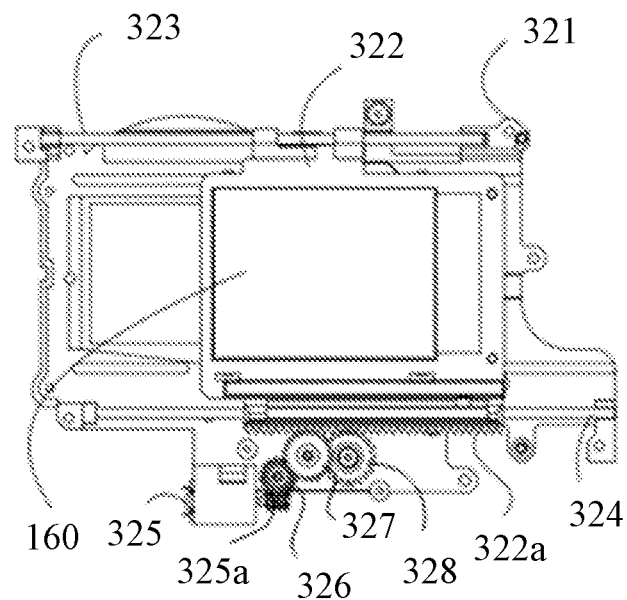
Figure 11C:
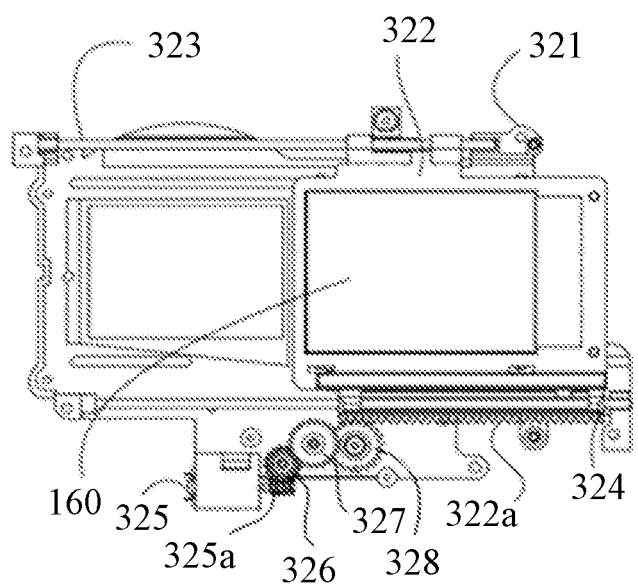

Next, with reference to FIGS. 11A to 11C, a description is given of state transitions of the optical filter unit 320. FIGS. 11A to 11C are explanatory diagrams when the optical filter unit 320 is driven. FIG. 11A illustrates an inserted state in which the optical filter 160 overlaps the opening 190. FIG. 11B illustrates a middle state in which the optical filter 160 is moving from the inserted state to a retracted state. FIG. 11C illustrates the retracted state in which the optical filter 160 is retracted from the opening 190.

When the user presses the multifunction button 113 in the inserted state of FIG. 11A, the optical filter unit 320 starts moving to the retracted state. Rotation of motor 325 is transmitted to the rack gear shape 322a of the holding member 322 via the first gear 326, the second gear 327, and the third gear 328. While being guided by the upper rail 323 and the lower rail 324, the optical filter 160 reaches the retracted state (FIG. 11C) from the inserted state (FIG. 11A) through the middle state (FIG. 11B). A detection signal from a position sensor (not illustrates) causes the optical filter 160 that has reached the retracted state to stop.

If the user wants to reinsert the optical filter 160, the user presses the multifunction button 113 in the retracted state illustrated in FIG. 11C, and thereby the motor 325 is caused to rotate in a direction opposite to a rotational direction in the above-described operation. This causes the optical filter 160 to move through the middle state illustrated in FIG. 11B to the inserted state illustrated in FIG. 11A. A detection signal from the position sensor (not illustrated) causes the optical filter 160 that has reached the inserted state to stop similarly to the retracted state. With the above configuration, the image pickup apparatus 100a including the optical filter 160 can easily switch the optical filter 160 between the inserted state and the retracted state without becoming large.

Figure 12A:
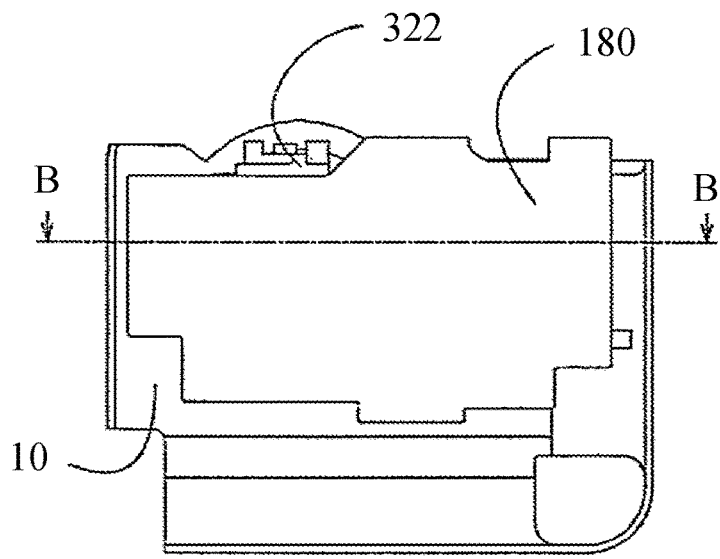
FIGS. 12A to 12C are sectional views of the image pickup apparatus according to the second embodiment.
Figure 12B:
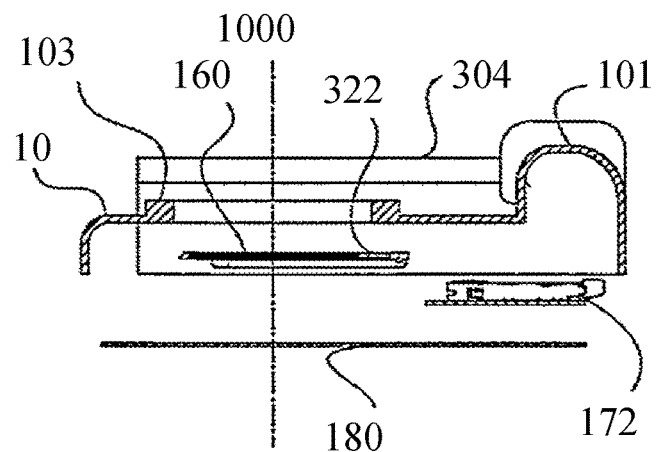
Figure 12C:
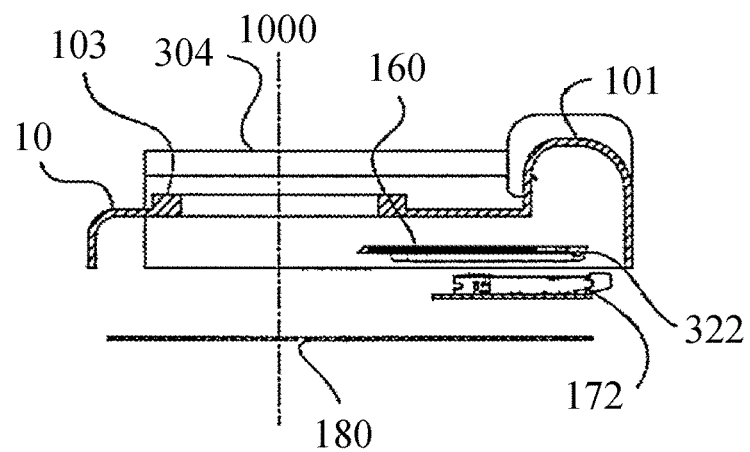

With reference to FIGS. 12A to 12C, a description is given of an arrangement of the optical filter 160 and the holding member 322 in the image pickup apparatus 100a in the transition from the inserted state to the retracted state. FIGS. 12A to 12C are sectional views of the image pickup apparatus 100a. FIG. 12A is a diagram illustrating the front cover 10, the optical filter 160, the holding member 322, the media slot 172, and a main board (control board) 180 as viewed from the rear surface side of the image pickup apparatus 100a. FIG. 12B is a sectional view along a line BB in FIG. 12A when the optical filter 160 is in the inserted state. FIG. 12C is a sectional view along the line BB in FIG. 12A when the optical filter 160 is in the retracted state.

As illustrated in FIG. 12C, in the retracted state, the optical filter 160 is retracted into a position between the grip portion 101 and the media slot 172 or the main board 180. Thus, the optical filter 160 can be retracted to the retracted state without an increase in the size of the image pickup apparatus 100a and interference between the optical filter 160 and internal components such as the main board 180 and the media slot 172.

Figure 13:
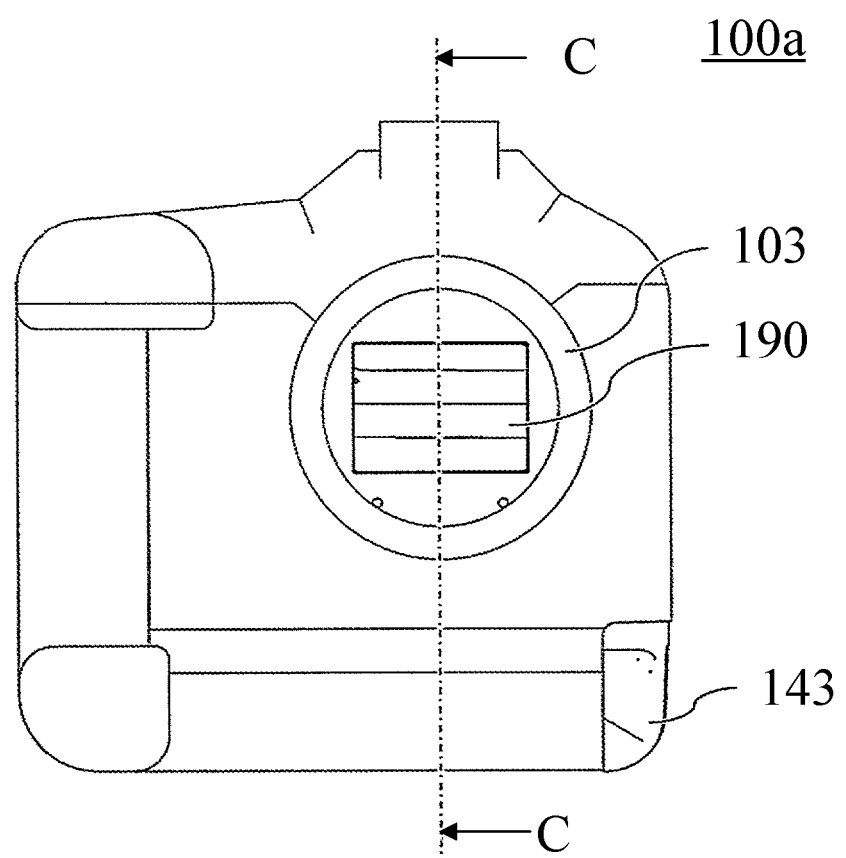
FIG. 13 is a front view of the image pickup apparatus according to the second embodiment.
Figure 14:
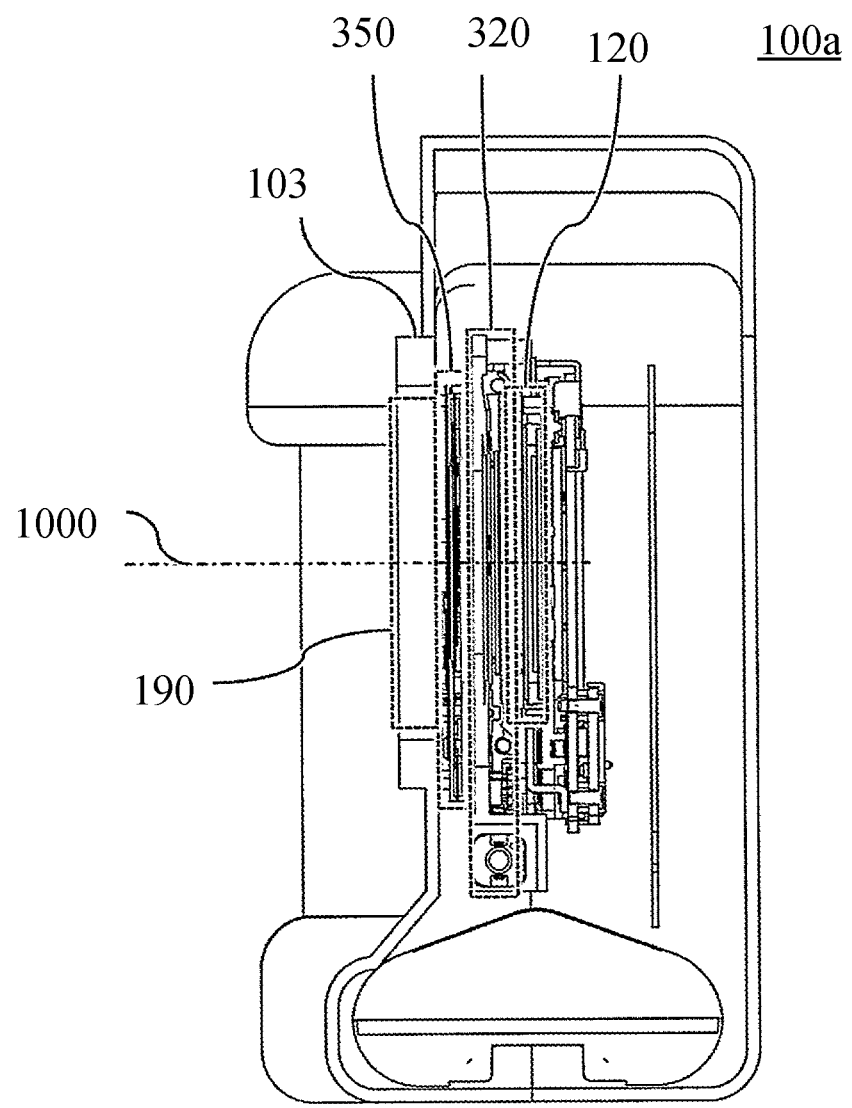
FIG. 14 is a longitudinal sectional view of the image pickup apparatus according to the second embodiment.

Next, with reference to FIGS. 13 and 14, a detailed description is given of an arrangement order on the optical axis of the focal plane shutter 350, the optical filter unit 320 (optical filter 160), and the image pickup unit 120 according to this embodiment. FIG. 13 is a front view of the image pickup apparatus 100a. FIG. 14 is a longitudinal sectional view of the image pickup apparatus 100a and illustrates a section along a line CC in FIG. 13.

As illustrated in FIG. 14, the focal plane shutter 350, the optical filter unit 320 (optical filter 160), and the image pickup unit 120 are arranged in this order from the side closer to the mount portion 103 on the optical axis 1000. The front curtain shutter of the focal plane shutter 350 is in a closed state when an image is not captured or when the power is turned off, such as when the lens is to be interchanged. Such a configuration can provide the following effects.

By closing the focal plane shutter 350 near the opening 190 when the lens is not attached, such as when the lens is to be interchanged, dust can be prevented from entering the image pickup apparatus 100a from the opening 190. Therefore, it is possible to reduce a problem that dust attaches to the optical filter 160, the optical low pass filter 122 of the image pickup unit 120, and the like that are disposed on an inner side of the focal plane shutter 350, and the dust appears in a captured image.

Furthermore, a distance between the focal plane shutter 150 and the image sensor 121 can be increased. This reduces a problem that dust generated by traveling of the front curtain shutter or the rear curtain shutter of the focal plane shutter 350 directly attaches to the optical low pass filter 122 of the image pickup unit 120 or the like and the dust appears in a captured image.

As described above, the motor 325 causes the optical filter 160 to move between a first position (the position of the inserted state) at which the optical filter 160 is inserted into the image pickup range (opening 190) and a second position (the position of the retracted state) at which the optical filter 160 is retracted from the image pickup range in a direction from the first position toward the grip portion 101. The optical filter 160 is located on a side closer to the image sensor 121 than the light blocking member (focal plane shutter 350).

The second position may be a position between the grip portion 101 and the control board (main board 180). The image pickup apparatus 100*a* may include a memory medium insertion portion (media slot 172) that a recording medium (external recording medium 148) can be inserted into and ejected from. The second position is a position between the grip portion 101 and the memory medium insertion portion. The motor 325 may linearly move the optical filter 160 parallelly to a plane orthogonal to the optical axis 1000. The moving direction of the optical filter 160 may be substantially the same as the insertion/ejection direction of the recording medium. The moving direction of the optical filter 160 may be substantially the same as the insertion/ejection direction of the battery 143 that can be inserted into and ejected from the image pickup apparatus 100*a*.

Each embodiment provides an image pickup apparatus that can easily switch an optical filter between a use state and a non-use state without becoming large, and can hinder dust from attaching to the optical filter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the above embodiments describe the configuration that controls the insertion/retraction of the optical filter 160 in response to the user pressing the multifunction button 113, but the configuration is not limited to this. For example, in a case where the insertion/retraction of the optical filter 160 can be adjusted as one of parameters for exposure control, a configuration may be such that the image pickup apparatus 100 automatically insert/retract the optical filter 160 depending on brightness of an object.

This application claims the benefit of Japanese Patent Application No. 2022-032478, filed on Mar. 3, 2022, which is hereby incorporated by reference herein in its entirety.

What is claimed is:

1. An image pickup apparatus comprising:
an image sensor;
an optical filter;
a holding member configured to hold the optical filter;
a driving unit configured to move the holding member;
a grip portion configured to be gripped by a user; and
a light blocking member configured to control blocking or opening of an image pickup range,
wherein the driving unit rotationally moves the optical filter between (i) a first position at which the optical filter is inserted into the image pickup range and (ii) a second position at which the optical filter is retracted from the image pickup range in a direction from the first position toward the grip portion, and
wherein the optical filter is located on a side closer to the image sensor than the light blocking member.

2. The image pickup apparatus according to claim 1, wherein in a state where the optical filter is at the first position, the optical filter is located between the image sensor and the light blocking member.

3. The image pickup apparatus according to claim 1, wherein the optical filter moves to the second position by rotating 90 degrees from the first position.

4. An image pickup apparatus comprising:
an image sensor;
an optical filter;
a holding member configured to hold the optical filter;
a driving unit configured to move the holding member;
a grip portion configured to be gripped by a user; and
a light blocking member configured to control blocking or opening of an image pickup range,
wherein the driving unit moves the optical filter between (i) a first position at which the optical filter is inserted into the image pickup range and (ii) a second position at which the optical filter is retracted from the image pickup range in a direction from the first position toward the grip portion, and
wherein the optical filter is located on a side closer to the image sensor than the light blocking member, and
wherein the second position is a position between the image pickup range and a battery that can be inserted into and ejected from the image pickup apparatus.

5. The image pickup apparatus according to claim 1, wherein the optical filter retracts from the first position to the second position parallelly to a plane orthogonal to an optical axis of an image pickup optical system.

6. The image pickup apparatus according to claim 5, wherein the optical filter rotationally moves about a shaft located on a side to which a bottom surface of the image pickup apparatus is closer than the optical axis is.

7. The image pickup apparatus according to claim 6, wherein the shaft is located on a side to which the bottom surface is closer than the image pickup range is.

8. The image pickup apparatus according to claim 6, wherein in a view from a rear surface side of the image pickup apparatus, the shaft is provided between the optical axis and a short side closer to the grip portion of two short sides defining the image pickup range.

9. The image pickup apparatus according to claim 5, wherein the driving unit is located on a side to which a bottom surface of the image pickup apparatus is closer than the optical axis is.

10. The image pickup apparatus according to claim 1, further comprising a control board,
wherein the second position is located between the grip portion and the control board.

11. The image pickup apparatus according to claim 10, further comprising a memory medium insertion portion into and from which a recording medium can be inserted and ejected,
wherein the second position is located between the grip portion and the memory medium insertion portion.

12. The image pickup apparatus according to claim 11, wherein a moving direction of the optical filter is the same as an insertion/ejection direction of the recording medium.

13. The image pickup apparatus according to claim 10, the moving direction of the optical filter is the same as an insertion/ejection direction of a battery that can be inserted into and ejected from the image pickup apparatus.

14. The image pickup apparatus according to claim 1, wherein the light blocking member is a focal plane shutter.

15. The image pickup apparatus according to claim 1, further comprising a mount portion to which a lens apparatus is detachably attachable, wherein the light blocking member is located on a side to which the mount portion is closer than the optical filter is.

16. The image pickup apparatus according to claim 15, wherein the image pickup range is defined by an opening provided inside the mount portion.

17. The image pickup apparatus according to claim 1, wherein the optical filter is an ND filter, a PL filter, or a soft filter.

* * * * *